United States Patent [19]

Ohkuma et al.

[11] Patent Number: 5,237,547

[45] Date of Patent: Aug. 17, 1993

[54] MULTI-HEAD MAGNETO-OPTICAL DISK APPARATUS

[75] Inventors: Hiroya Ohkuma, Tokyo; Tomohisa Hasumi, Kawaguchi, both of Japan

[73] Assignee: Nikon Corporation, Tokyo, Japan

[21] Appl. No.: 252,140

[22] Filed: Oct. 3, 1988

[30] Foreign Application Priority Data

| Oct. 6, 1987 | [JP] | Japan | 62-251867 |
| Oct. 30, 1987 | [JP] | Japan | 62-274849 |
| Oct. 30, 1987 | [JP] | Japan | 62-274850 |
| Oct. 30, 1987 | [JP] | Japan | 62-274851 |

[51] Int. Cl.[5] .......................................... G11B 13/04
[52] U.S. Cl. .................................... 369/13; 360/114
[58] Field of Search ................. 369/13, 32; 360/59, 360/114; 365/122, 234

[56] References Cited

U.S. PATENT DOCUMENTS

| 4,460,988 | 7/1984 | Gordon | 365/234 |
| 4,788,671 | 11/1988 | Kanda | 369/13 |
| 4,802,021 | 1/1989 | Makagawa et al. | 369/13 |
| 4,807,204 | 2/1989 | Mizutani et al. | 369/13 |
| 4,841,502 | 6/1989 | Murakami et al. | 369/13 |
| 4,845,696 | 7/1989 | Ohtsuki et al. | 360/114 |
| 4,868,802 | 9/1989 | Kobori | 369/13 |

*Primary Examiner*—Robert W. Beausoliel, Jr.
*Attorney, Agent, or Firm*—Shapiro and Shapiro

[57] ABSTRACT

A magneto-optical disk apparatus in which a magneto-optical disk is loaded, data can be recorded on the magneto-optical disk, the data recorded on the magneto-optical disk can be reproduced and the data recorded on the magneto-optical disk can be erased includes a plurality of head devices for applying beams to the magneto-optical disk, the number of the head devices being an even number, a control device for controlling the plurality of head devices so that respective ones of the plurality of head devices apply beams to different ones of a plurality of annular areas on the magneto-optical disk, the number of the annular areas being the same as the number of the head devices, the control devices having a plurality of supporting devices for supporting each two of the plurality of head devices thereon, the two head devices supported on the plurality of supporting devices being supported so as to apply beams to two recording areas which are not adjacent to each other, and an applying device for applying a magnetic field to the plurality of annular areas, the applying device applying a magnetic field to the magneto-optical disk in a predetermined direction when the data is recorded on the magneto-optical disk, and changing the direction of the magnetic field applied to the magneto-optical disk to the direction opposite to the predetermined direction when the data recorded on the magneto-optical disk is erased.

2 Claims, 5 Drawing Sheets

MULTI-HEAD MAGNETO-OPTICAL DISK APPARATUS

BACKGROUND OF THE INVENTION

1. Field of the Invention

This invention relates to a magneto-optical disk apparatus for recording and reproducing information such as images on a magneto-optical disk.

2. Related Background Art

As a magneto-optical disk apparatus for recording and reproducing image information or the like on a magneto-optical disk, there is known one shown in FIGS. 1 and 2 of the accompanying drawings as disclosed, for example, in U.S. Ser. No. 427,959 filed Oct. 25, 1989 (now U.S. Pat. No. 4,998,238 issued Mar. 5, 1991), which is a continuation application of U.S. Ser. No. 172,678 filed Mar. 24, 1988 (now abandoned) by the same assignee as the present application.

FIG. 1 shows a magneto-optical disk which is a recording medium, and FIG. 2 shows the construction of a magneto-optical disk apparatus.

The magneto-optical disk 1, as shown in FIG. 1, is divided into an outer recording area 1a and an inner recording area 1b, and as shown in FIG. 2, is rotated at a constant speed by a spindle motor 2. At lower locations opposed to the outer and inner recording areas 1a and 1b of the magneto-optical disk 1, magneto-optical heads 13a and 13b endowed with the erasing and reproducing functions and magneto-optical heads 14a and 14b endowed with the recording and reproducing functions are disposed divisionally at circumferentially different positions (for example, positions different by 180°).

The erasing and reproducing magneto-optical heads 13a and 13b are carried on a head slider 7 which is moved radially along a slider rail 11 by a slider driving magnet 9 so that the outer recording area 1a can be traced by the magneto-optical head 13a and the inner recording area 1b can be traced by the magneto-optical head 13b.

This also holds true of the recording and reproducing magneto-optical heads 14a and 14b, that is, the magneto-optical heads 14a and 14b are carried on a head slider 8 which is movable radially along a guide rail 12 by a slider driving magnet 10.

Permanent magnets 15 and 16 are disposed at upper locations opposed to the magneto-optical heads 13a, 13b and 14a, 14b, respectively, with the magneto-optical disk 1 interposed therebetween. The permanent magnet 15 applies, for example, a downward extraneous magnetic field as an erasing magnetic field to the magneto-optical disk 1, while the permanent magnet 16 applies an upward extraneous magnetic field as a recording magnetic field to the magneto-optical disk 1.

First, during the recording operation, the recording areas of the magneto-optical disk 1 are erased by the magneto-optical heads 13a and 13b, prior to recording. This erasing operation is accomplished by applying a light spot of a strong laser beam from the magneto-optical heads 13a and 13b to the corresponding recording areas of the magneto-optical disk 1 to heat the recording areas to a critical temperature or higher, and making the direction of magnetization uniform downwardly (in the direction of arrow A) by the extraneous magnetic field by the permanent magnet 15 in the cooling process of the magneto-optical disk 1.

When that portion of the magneto-optical disk 1 which has thus been erased makes about one half of one full rotation and arrives at the position of the recording and reproducing magneto-optical heads 14a and 14b, the disk 1 is heated to a critical temperature or higher by the application of a light spot of a laser beam modulated by a recording signal, for example, the application of a light spot corresponding to the recording bit "1", and in the cooling process thereof, the direction of magnetization is reversed to the upward (the direction of arrow B) direction of magnetization by the extraneous magnetic field of the permanent magnet 16, whereby the recording operation is accomplished.

During reproduction, either the magneto-optical heads 13a, 13b or the magneto-optical heads 14a, 14b are used as reproducing heads, and a light spot of a weak laser beam is applied, for example, from the magneto-optical heads 13a, 13b to the magneto-optical disk 1, and the direction of polarization of the reflected light therefrom which depends on the direction of magnetization is read to thereby reproduce the recording signal.

However, in such a conventional magneto-optical disk apparatus, the transfer rate of the recording signal and the recording time have been fixed in dependence of the number of recording heads and therefore, for example, in an apparatus directed to the recording and reproduction of the standard quality of monochromatic image, there has been the problem that the reversible reproduction of the high quality of monochromatic image or the standard quality of colored image which requires a higher transfer rate cannot be accomplished.

That is, when viewed with the 3:1:0 component system directed to the standard quality of colored image in which a Y signal, a B-Y signal and an R-Y signal are sampled and recorded at sampling frequencies three times, 0.5 times and 0.5 times as high as the color subcarrier wave frequency Fsc as the standard, the standard quality of monochromatic image can be regarded as the so-called 2:0:0 component system in which the Y signal, the B-Y signal and the R-Y signal are sampled as twice, 0 times and 0 times respectively the color subcarrier wave frequency Fsc, and the high quality of monochromatic image can likewise by regarded as the so-called 4:0:0 component system in which the Y signal, the B-Y signal and R-Y signal are sampled as four times, 0 times and 0 times, respectively, the color sub-carrier wave frequency Fsc, and in an apparatus directed to the standard quality of monochromatic image, recording and reproduction of the high quality of monochromatic image or the standard quality of colored image which requires a transfer rate twice as high as the conventional one cannot be accomplished.

SUMMARY OF THE INVENTION

It is an object of the present invention to provide a magneto-optical disk apparatus which effects recording and reproduction at a transfer rate higher than the conventional one.

To achieve the above object, the apparatus of the present invention is designed such that recording and reproduction can be accomplished with the recording area of a magneto-optical disk divided into four or eight recording areas from the outer periphery toward the inner periphery.

DESCRIPTION OF THE PREFERRED EMBODIMENTS

Figure 3:
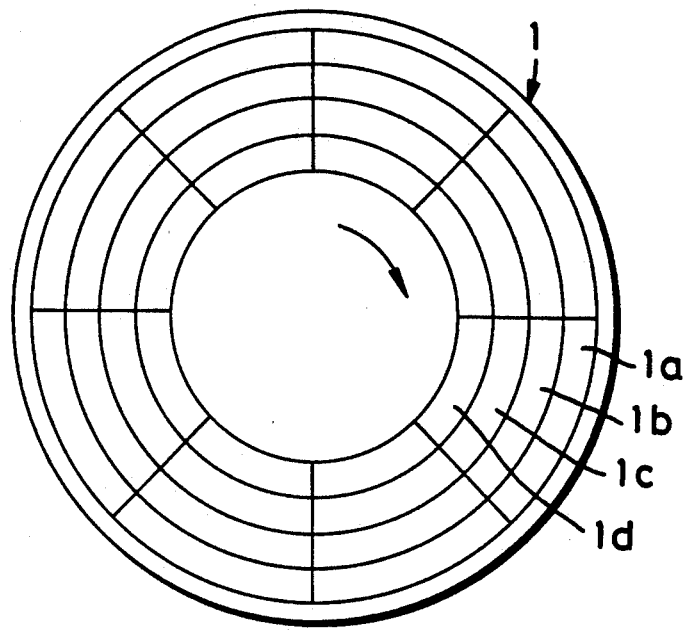
FIG. 3 shows the recording areas of a magneto-optical disk according to a first embodiment of the present invention.

As shown in FIG. 3, in a magneto-optical disk 1 used in a first embodiment of the present invention, the recording area is divided, for example, into four recording areas 1a, 1b, 1c and 1d in the diametrical direction from the outer periphery toward the inner periphery.

Figure 4:
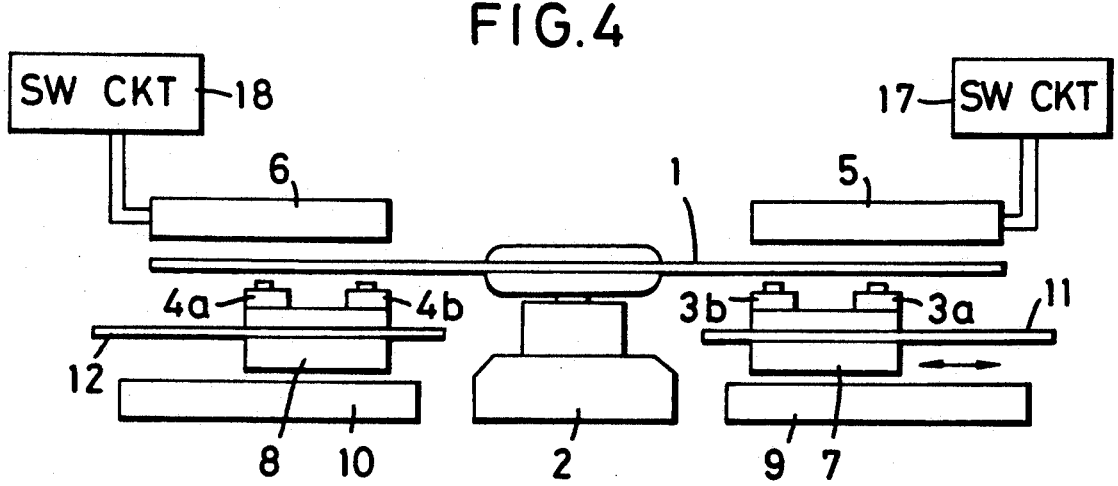
FIG. 4 is a schematic view of the apparatus of the first embodiment of the present invention.

The magneto-optical disk 1 having its recording area thus divided into four areas is rotated at a predetermined speed, e.g., 3600 rpm, by a spindle motor 2 while being mounted on a magneto-optical disk apparatus as shown in FIG. 4.

Two magneto-optical heads 3a and 3b carried on a head slider 7 are provided at a lower location opposed to the magneto-optical disk 1. In addition to the movement of the magneto-optical heads 3a and 3b by the head slider 7, a driving mechanism for a galvanomirror, etc. is contained in the magneto-optical heads 3a and 3b themselves, whereby a laser beam can be scanned diametrically of the magneto-optical disk 1 by a galvanomirror mechanism contained in the heads after the positioning by the head slider 7.

Also, magneto-optical heads 4a and 4b carried on a head slider 8 are provided at a location diametrically deviating by 180° relative to the magneto-optical heads 3a and 3b carried on the head slider 7. A beam scanning mechanism using a galvanomirror, etc. is also contained in the magneto-optical heads 4a and 4b themselves.

Each of the four magneto-optical heads 3a, 3b, 4a and 4b thus disposed below the magneto-optical disk 1 has the erasing, recording and reproducing functions.

An electromagnet 5 is disposed at an upper location opposed to the magneto-optical heads 3a and 3b with the magneto-optical disk 1 interposed therebetween, and the electromagnet 5 is designed such that the direction of its magnetic field applied to the magneto-optical disk 1 is switched by a switch circuit 17. That is, during erasing, the electromagnet 5 applies a downward erasing magnetic field to the magneto-optical disk 1, and during recording, it applies an upward recording magnetic field to the magneto-optical disk 1.

Also, an electromagnet 6 is disposed at an upper location opposed to the magneto-optical heads 4a and 4b with the magneto-optical disk 1 interposed therebetween, and the electromagnet 6 also is designed such that the direction of its extraneous magnetic field applied to the magneto-optical disk 1 can be switched by a switch circuit 18, and during erasing, the electromagnet 6 applies a downward erasing magnetic field, and during recording, it applies an upward recording magnetic field.

Figure 5:
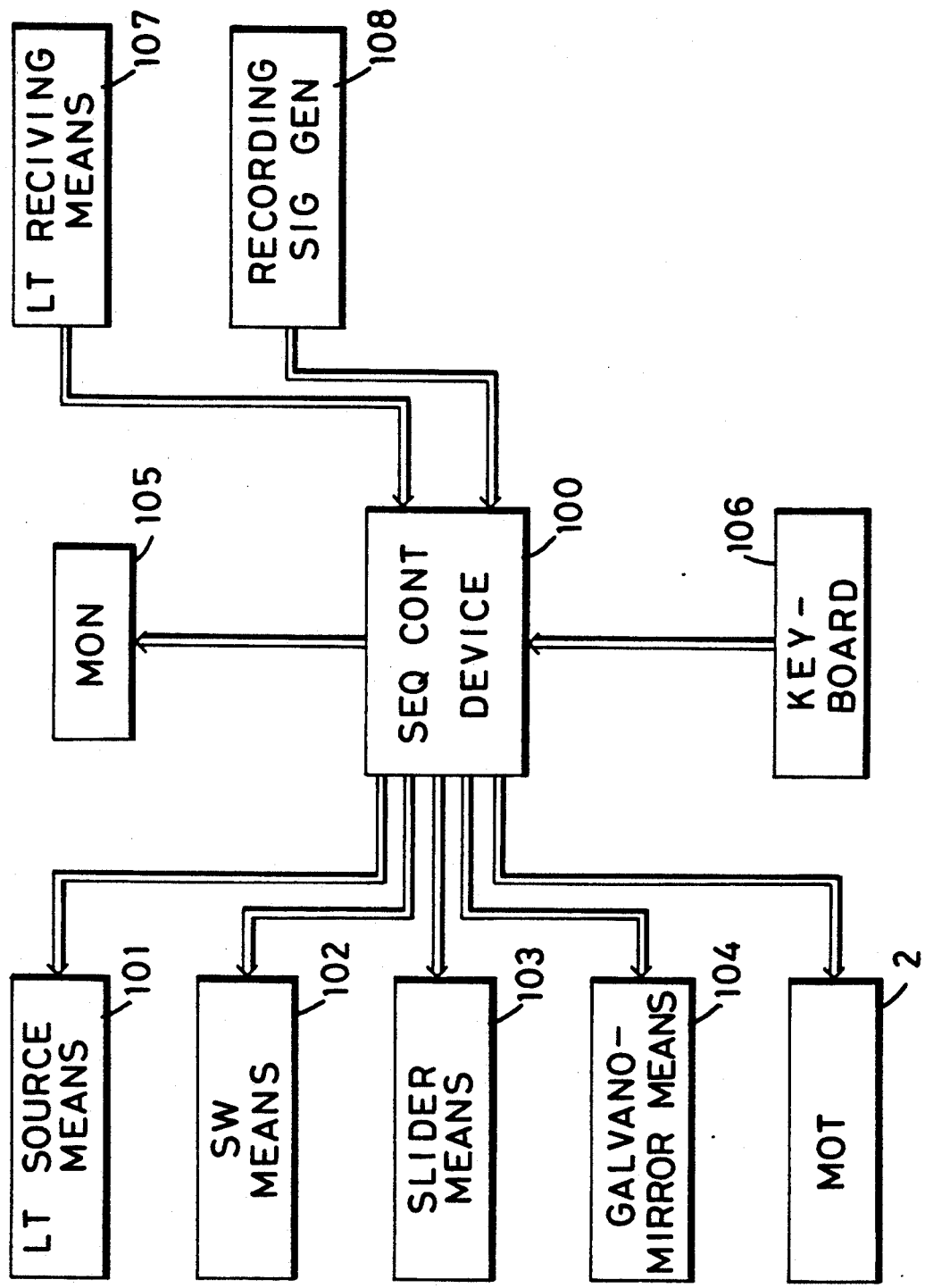
FIG. 5 is a block diagram of the control system of the first embodiment of the present invention.

The control system of the present invention will now be described with reference to FIG. 5. The magneto-optical heads 3a, 3b, 4a and 4b each have a light source producing rectilinearly polarized laser light, a galvanomirror for adjusting the position of incidence of the rectilinearly polarized light in the radial direction of the magneto-optical disk, and a light receiving element for receiving reflected light from the magneto-optical disk and producing a signal conforming to the information recorded on the magneto-optical disk. In FIG. 5, these light sources are shown as light source means 101, the galvanomirrors are shown as galvanomirror means 104, and the light receiving elements are shown as light receiving means 107. Switch means 102 corresponds to the switch circuits 17 and 18, and slider means 103 corresponds to the slider driving magnets 9 and 10. A sequence control device 100 effects the recording, reproducing and erasing operations on the basis of signals from a keyboard 106. During recording, the sequence control device 100 processes a signal from a recording signal generator 108, outputs it to the light receiving means 101, and controls the switch means 102 thereby record information on the magneto-optical disk. During reproduction, the sequence control device 100 causes a monitor 105 to display an image thereon on the basis of a signal from the light source means 107. In the present embodiment, signals recorded on the magneto-optical disk are image signals, but in the present invention, the image signals are not limited to signals recorded on a magneto-optical disk.

In the present embodiment, a plurality of heads operate in corresponding recording areas and therefore, the track number is pre-recorded on each track of the magneto-optical disk, and data regarding the track number on which each head operates in stored in an internal memory in the sequence control device 100, and slider driving magnets and galvanomirrors are controlled on the basis of the stored data.

Also, in the present embodiment, as will be described later, the design is such that the corresponding recording areas of the two heads provided on the same head slider are not adjacent to each other. This is because the apparatus of the present embodiment is designed so as to be also adapted for a magneto-optical disk comprising two recording areas corresponding to FIG. 1. When erasing or recording is to be effected on the magneto-optical disk of FIG. 1 by only the two heads of one head slider, the spacing between the two heads on the same head slider in the radial direction needs to be a predetermined distance or greater for proper cooperation with the recording areas 1a and 1b (the galvanomirrors being used for fine adjustment of radial displacement of the beams). Thus, with the head spacing appropriate for cooperation with the recording areas 1a and 1b of FIG. 1, when the heads are used with a disk of the type shown in FIG. 3, the corresponding recording areas of the two heads provided on the same head slider are not adjacent to each other.

The operation of the above-described embodiment will now be described. The recording and reproducing operations which require a high transfer rate as for high quality of monochromatic image or standard quality of colored image are as follows. First, in the erasing operation effected prior to recording, the control device 100 brings about a state in which an erasing magnetic field is applied to the switch circuits 17 and 18 with the direction of the extraneous magnetic fields to the magneto-optical disk 1 by the electromagnets 5 and 6 being downward. With the erasing magnetic field thus applied to the magneto-optical disk 1 by the electromagnets 5 and 6, the magneto-optical head 3a causes the outermost recording area 1a to be traced, the magneto-optical head 3b causes the third recording area 1c from the outer periphery to be traced, the magneto-optical head 4a causes the second recording area 1b from the outer periphery to be traced, and the magneto-optical head 4b causes the innermost recording area 1d to be traced. The erasing by the tracing of the recording areas 1a–1d by such magneto-optical heads 3a, 3b, 4a and 4b is such that the control device 100 causes a light spot of a laser beam to be applied from the magneto-optical head to thereby heat the treated portion to a critical temperature or higher and during the cooling process thereof, the traced portions are subjected to the downward erasing magnetic field by the electromagnet 5 or 6, whereby the erased portions are arranged in the downward direction of magnetization.

When the erasing operation for the recording areas 1a–1d is terminated in this manner, the control device 100 causes the switch circuits 17 and 18 to switch the direction of the current flowing to the electromagnets 5 and 6 to the reverse direction and applies an upward recording extraneous magnetic field to the magneto-optical disk 1. With the recording extraneous magnetic field being thus applied, the control device 100 supplies recording signals to the magneto-optical heads 3a, 3b, 4a and 4b in a parallel fashion, and causes a light spot of a laser beam modulated by the recording signals, i.e., a light spot of signal bit "1", to be applied to heat the irradiated portion to a critical temperature or higher, and during the cooling process thereof, signal recording is effected with the direction of magnetization being reversed to the upward direction of magnetization determined by the extraneous magnetic field of the electromagnet 5 or 6.

On the other hand, the reproducing operation is such that light spots of laser beams weaker than during recording are applied to the corresponding recording areas of the magneto-optical disk 1 in a parallel fashion from the four magneto-optical heads 3a, 3b, 4a and 4b and the direction of polarization of the reflected light therefrom depending on the direction of magnetization is read, whereby the recording signals can be reproduced.

By distributing the recording signals to form areas by the recording and reproduction thus using the four magneto-optical heads 3a, 3b, 4b and 4a in a parallel fashion, as compared with the conventional recording and reproduction of the standard transfer rate using two magneto-optical heads, recording and reproduction of high quality of monochromatic image and standard quality of colored image at a transfer rate twice higher become possible.

In the recording and reproduction by a high transfer rate for which the recording area of the magneto-optical disk 1 is divided into four, each division of the recording area is narrow and therefore, the recording and reproduction times become one half as compared with the standard transfer rate.

On the other hand, in the above-described first embodiment, besides the recording and reproduction in which the transfer rate is twice higher, the recording and reproduction by the same standard transfer rate as that in the conventional apparatus can also be performed.

Figure 1:
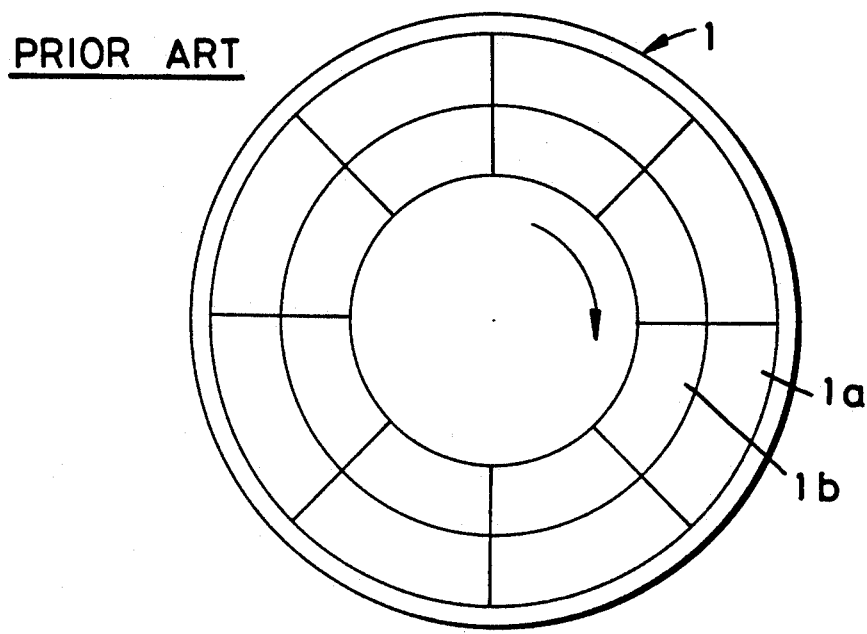
FIG. 1 shows the recording areas of a conventional magneto-optical disk.
Figure 2:
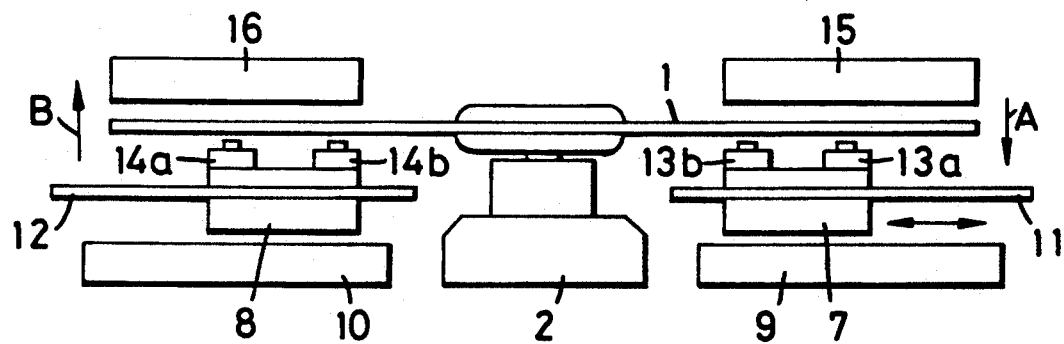
FIG. 2 is a schematic view of a conventional magneto-optical disk apparatus.

During the recording and reproduction by this standard transfer rate, a downward erasing magnetic field is applied from the electromagnet 5 to the magneto-optical disk 1 by the switch circuit 17, while an upward recording magnetic field is applied from the electromagnet 6 to the magneto-optical disk 1 by the switch circuit 18, and the magneto-optical heads 3a and 3b are used as erasing and reproducing heads, and the magneto-optical heads 4a and 4b are used as recording and reproducing heads, and further, the recording area of the magneto-optical disk 1 divided into four is grouped into the outer recording areas 1a, 1b and the inner recording areas 1c, 1d, and the magneto-optical heads 3a, 4a and 3b, 4b are made to correspond to each other, whereby the recording and reproduction by a standard transfer rate entirely similar to that in the conventional apparatus shown in FIGS. 1 and 2 can be accomplished.

In the first embodiment of FIGS. 3 and 4, the correspondence between the divided recording areas and the magneto-optical heads is not limited to that shown, but for example, the magneto-optical head 3a may be made to correspond to the outermost recording area 1a, the magneto-optical head 3b may be made to correspond to the second recording area 1b from the outer periphery, the magneto-optical head 4a may be made to correspond to the third recording area 1c from the outer periphery, and the magneto-optical head 4b may be made to correspond to the innermost recording area 1d.

As described above, in the first embodiment of the present invention, the transfer rate can be made twice higher without the number of the heads being increased, whereby recording and reproduction of high quality of monochromatic image and standard quality of colored image have become possible.

A second embodiment of the present invention will now be described with reference to FIG. 6. Here, two disk control devices 101 and 102 corresponding to the apparatus of the first embodiment shown in FIG. 4 are provided. The disk control devices 101 and 102 effect erasing, recording and reproduction on a magneto-optical disk having four recording areas similar to those shown in FIG. 3. That is, in the second embodiment, there are total eight recording areas for two magneto-optical disks. A sequence control device 100a is an improvement over the sequence control device 100 shown in FIG. 5 in that it has been made so as to be capable of controlling the two disk control devices.

Also, the transfer rate of the apparatus of the second embodiment may be made twice as high as the transfer rate of the conventional apparatus shown in FIGS. 1 and 2, as in the first embodiment. In such case, each of the two magneto-optical disks has two recording areas, like the magneto-optical disk of FIG. 1. The relation of the heads in the disk control devices 101 and 102 with the recording areas of the magneto-optical disks is the same as that when the apparatus of the first embodiment is operated at the conventional transfer rate.

When recording and reproduction are to be effected at the same transfer rate as the conventional one by the apparatus of the second embodiment, each of the two magneto-optical disks is divided into two outer and inner areas, and the corresponding between the magneto-optical heads and the recording areas is made similar to the transfer rate twice the aforedescribed conventional one, and recording and reproduction are first effected for the outer and inner areas of one magneto-optical disk, whereafter recording and reproduction are effected for the outer and inner areas of the other magneto-optical disk.

As regards the difference between the same transfer rate as the conventional one in the apparatus of the second embodiment, the transfer rate twice as high as the conventional one and the transfer rate four times as high as the conventional one, the same transfer rate as the conventional one and the transfer rate twice as high as the conventional one permit superposition writing to be effected on the magneto-optical disk, whereas the transfer rate four times as high as the conventional one does not permit superposition writing to be effected on the magneto-optical disk and therefore, recording must be effected after the information recorded on the magneto-optical disk is once erased, but these three modes can be switched and used in a common apparatus and therefore, when for example, the standard quality of monochromatic image, the 3:1:10 component signal (the standard quality of colored image, the transfer rate twice as high as the conventional one) and the 4:2:2 component signal (the high quality of colored image, the transfer rate four times as high as the conventional one) are to be handled, recording and reproduction of these signals can be efficiently accomplished by a system.

Figure 7:
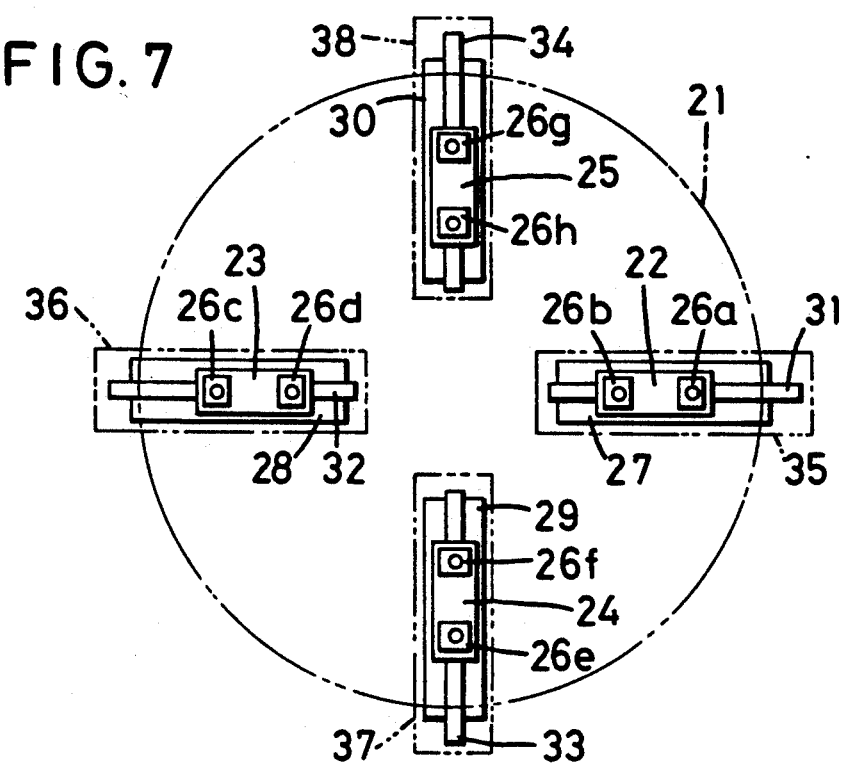
FIG. 7 is a schematic view of the apparatus of a third embodiment of the present invention.

A third embodiment of the present invention will now be described with reference to FIGS. 7 and 8. The third embodiment is an apparatus in which erasing, recording and reproduction are effected on a magneto-optical disk at the transfer rate four times as high as the conventional one. FIG. 7 is a schematic top plan view of a magneto-optical disk recording apparatus according to the third embodiment, and FIG. 8 is a top plan view of a magneto-optical disk 21 used in the third embodiment, and shows the divided state of the recording area.

Figure 8:
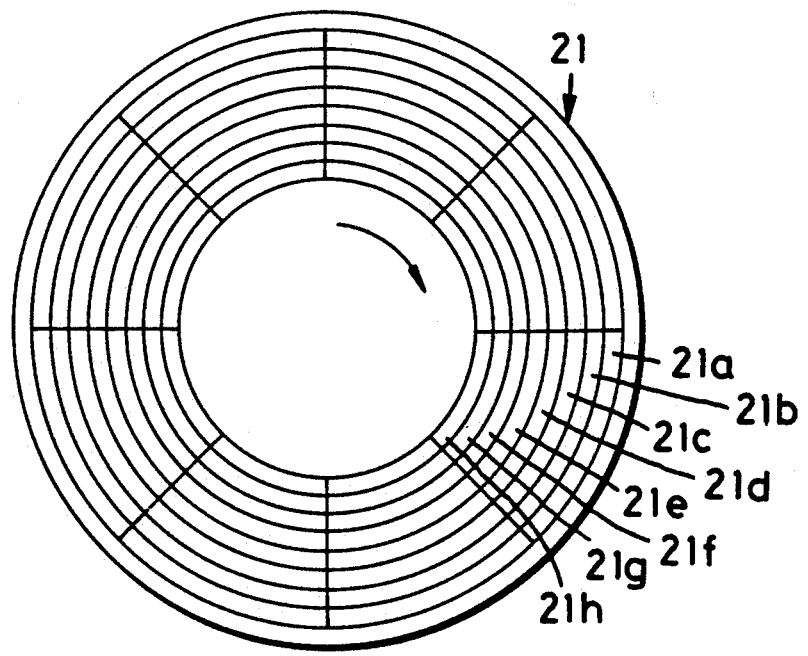
FIG. 8 shows the recording areas of a magneto-optical disk according to the third embodiment of the present invention.

The magneto-optical disk 21 used in the present invention, as shown in FIG. 8, has its recording area divided into eight recording areas 21a-21h diametrically from the outer periphery toward the inner periphery.

As regards magneto-optical head, electromagnets, heads sliders, etc. used correspondingly to the magneto-optical disk 21 having its recording area thus divided into eight, four head sliders 22-25 are disposed in such a manner that as shown in FIG. 7, the first slider 22 and the second slider 23 are opposed to each other with the center of rotation of the magneto-optical disk interposed therebetween and the third slider 24 and the fourth slider 25 are opposed to each other with the center of rotation of the magneto-optical disk interposed therebetween, and two of magneto-optical heads 26a-26h are carried on each of the head sliders 22-25. Above the magneto-optical heads 26a-26h, four electromagnets 27-30 are relatively disposed with the magneto-optical disk 21 interposed therebetween. The four electromagnets 27-30 are provided so as to be capable of changing over an erasing bias magnetic field and a recording bias magnetic field. Slider rails 31-34 are disposed below the head sliders 22-25, respectively, and four slider driving magnets 35-38 are disposed below the slider rails 31-34, respectively. The four electromagnets 27-30 each apply a downward erasing magnetic field to the magneto-optical disk 21 during erasing, and apply an upward recording magnetic field to the magneto-optical disk 21 during recording.

The third embodiment is constructed as described above, and the eight magneto-optical heads 26a-26h effect erasing, recording and reproduction.

Figure 6:
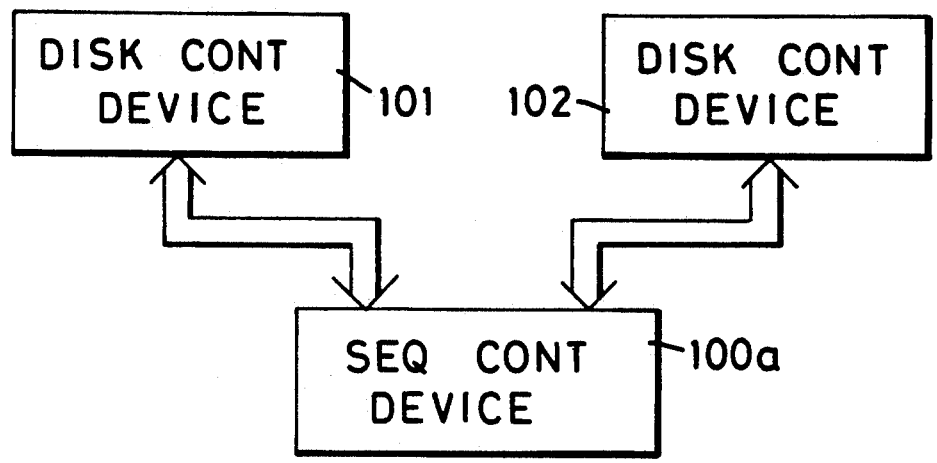
FIG. 6 is a block diagram showing the construction of a second embodiment of the present invention.

The sequence control device in the third embodiment is substantially similar in construction to that in the second embodiment shown in FIG. 6, because both the second embodiment and the third embodiment are of 8-head construction.

The operation of the third embodiment will now be described.

The recording and reproducing operations which require a high transfer rate as for the standard quality of colored image and the high quality of colored image are as follows.

First, in the erasing operation effected prior to recording, the four electromagnets 27-30 each apply a downward erasing magnetic field to the magneto-optical disk 21. Further, by the movement of the head sliders 22-25, the first magneto-optical head 26a is made to correspond to the outermost recording area 21a of the magneto-optical disk 21, the second magneto-optical head 26b is made to correspond to the fifth recording area 21e from the outer periphery, the third magneto-optical head 26c is made to correspond to the second recording area 21b from the outer periphery, the fourth magneto-optical head 26d is made to correspond to the sixth recording area 21f from the outer periphery, the fifth magneto-optical head 26e is made to correspond to the third recording area 21c from the outer periphery, the sixth magneto-optical head 26f is made to correspond to the seventh recording area 21g from the outer periphery, the seventh magneto-optical head 26g is made to correspond to the fourth recording area 21d from the outer periphery, and the eighth magneto-optical head 26h is made to correspond to the innermost recording area 21h. Thus, the erasing of the recording areas 21a-21h by the eight magneto-optical heads 26a-26h is such that as in the second embodiment, the eight magneto-optical heads 26a-26h apply the light spot of a strong laser beam to the recording areas 21a-21h and the irradiated portions thereof are heated to a critical temperature or higher and in the cooling process thereof, the recording areas are subjected to an erasing magnetic field and the downward direction of magnetization is made uniform in the irradiated portions of the recording areas 21a-21h. The recording and reproducing operations of the third embodiment are also similar to those of the second embodiment.

In the recording and reproduction by the high transfer rate for which the recording area of the magneto-optical disk 21 is divided into eight, the record area of a recording area is narrow and therefore, the recording and reproducing times are shortened to ¼ as compared with the standard transfer rate.

In the third embodiment, a description has been given of recording and reproduction in which the transfer rate is accelerated to four times, but in addition thereto, recording and reproduction by a transfer rate twice as high as the conventional one (the standard quality of colored image) or recording and reproduction by the same transfer rate as the conventional one (the standard quality of monochromatic image) can also be effected.

To effect recording and reproduction at a transfer rate twice as high as the conventional one, use is made of the magneto-optical disk 1 having its recording area divided into four diametrically from the outer periphery toward the inner periphery as shown in FIG. 3, and as shown in FIG. 7, the first and second magneto-optical heads 26a and 26b and the fifth and sixth magneto-optical heads 26e and 26f are used as erasing/reproducing heads, and the third and fourth magneto-optical heads 26c and 26d and the seventh and eighth magneto-optical heads 26g and 26h are used as recording/reproducing heads. As regards the correspondence between the eight magneto-optical heads 26a–26h and the recording areas 1a–1d of the magneto-optical disk 1, the first magneto-optical head 26a in FIG. 1 is used as the erasing/reproducing head for the outermost recording area 1a of the magneto-optical disk 1, the second magneto-optical head 26b is used as the erasing/reproducing head for the third recording area 1c from the outer periphery, the third magneto-optical head 26c is used as the recording/reproducing head for the outermost recording area 1a, the fourth magneto-optical head 26d is used as the recording/reproducing head for the third recording area 1c from the outer periphery, the fifth magneto-optical head 26e is used as the erasing/reproducing head for the second recording area 1b from the outer periphery, the sixth magneto-optical head 26f is used as the erasing/reproducing head for the innermost recording area 1d, the seventh magneto-optical head 26g is used as the recording/reproducing head for the second recording area 1b from the outer periphery, and the eighth magneto-optical head 26h is used as the recording/reproducing head for the innermost recording area 1d. To effect the erasing operation prior to recording, a downward erasing magnetic field is applied to the recording areas 1a–1d of the magneto-optical disk 1 by electromagnets 27 and 29, and the erasing/reproducing heads 26a, 26b, 26e and 26f apply a light spot of a strong laser beam to the recording areas 1a–1d, and the irradiated portions thereof are heated to a critical temperature or higher and in the cooling process thereof, the downward direction of magnetization is made uniform. Also, when the magneto-optical disk 1 of FIG. 3 is caused to make one half of one full rotation, the erased portions of the recording areas 1a–1d arrive at the positions opposed to the recording/reproducing heads 26c, 26d, 26g and 26h, respectively, as previously described. At this time, electromagnets 28 and 30 apply an upward recording magnetic field to the recording areas 1a–1d of the magneto-optical disk 1. In this state, the sequence control device supplies a recording signal to the recording/reproducing heads 26c, 26d, 26g and 26h, and correspondingly to the application of a light spot of a strong laser beam modulated by the recording signal, i.e., the signal bit "1", the four recording/reproducing heads apply light spots to the four recording areas 1a–1d, respectively, and the irradiated portions of the magneto-optical disk 1 are heated to a critical temperature or higher, and in the cooling process thereof, the direction of magnetization is reversed to the upward direction of magnetization and signal recording is effected. On the other hand, the reproducing operation is such that one of the aforementioned erasing/reproducing heads and the recording/reproducing heads applies a light spot of a weak laser beam to the four recording areas 1a–1d, and the four heads which have applied the light spot read the direction of polarization of the reflected light which depends on the direction of magnetization, whereby the sequence control device combines the signals and reproduces the recording signal.

When recording and reproduction are to be effected at the same transfer rate as the conventional one, the magneto-optical disk 1 divided into two recording areas 1a and 1b shown in FIG. 1 is used and the erasing/reproducing heads 26a, 26b and the recording/reproducing heads 26c, 26d are used in the apparatus of FIG. 1, and the erasing/reproducing heads 26e, 26f and the recording/reproducing heads 26g, 26h are not used. Thus, the erasing/reproducing heads 26a, 26b and the recording/reproducing heads 26c, 26d are used and therefore, the recording and reproducing operations are performed in the same manner as in the prior art.

The difference between the same transfer rate as the conventional one and the transfer rate twice as high as the conventional one and the transfer rate of the present embodiment four times as high as the conventional one is that the same transfer rate as the conventional one and the transfer rate twice as high as the conventional one permit superposition writing, whereas the transfer rate four times as high as the conventional one does not permit superposition writing and therefore writing must be effected after the mageto-optical disk is once erased, but these three modes can be changed over and used in a common apparatus and therefore, where for example, the standard quality of monochromatic image (the conventional transfer rate), the 3:1:0 component signal (the standard quality of colored image, the transfer rate twice as high as the conventional one) and the 4:2:2 component signal (the high quality of colored image, the transfer rate four times as high as the conventional one) are handled, recording and reproduction of these signals can be accomplished efficiently in an apparatus.

Figure 9:
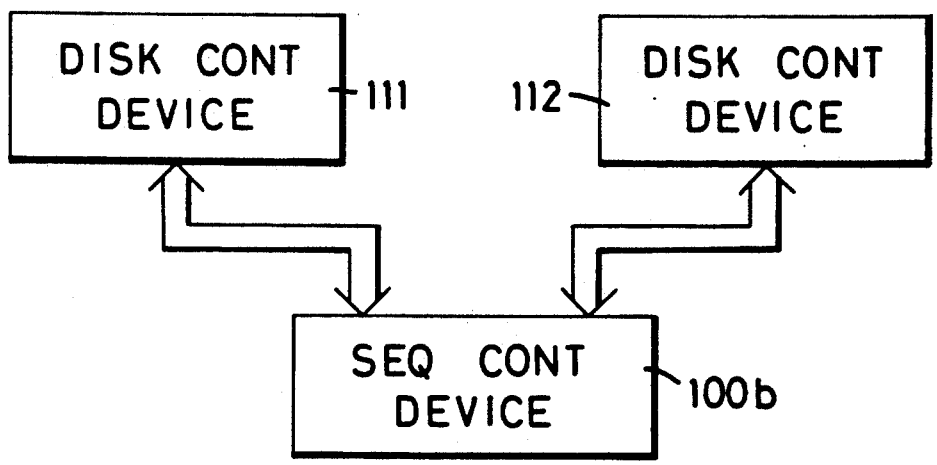
FIG. 9 is a block diagram showing the construction of a fourth embodiment of the present invention.

A fourth embodiment of the present invention is such that the recording and reproducing operations are performed at a transfer rate four times as high as the conventional one and the erasing and recording operations are performed by different heads. The fourth embodiment as shown in FIG. 9, has disk control devices 111 and 112 and a sequence control device 100b for controlling the devices 111 and 112. The disk control devices 111 and 112 correspond to the disk control devices of the third embodiment shown in FIG. 7, and each disk control device effects erasing, recording and reproduction on the magneto-optical disk shown in FIG. 3. The operations of the disk control devices 111 and 112 are the same as the operation for the magneto-optical disk of FIG. 3 in the third embodiment.

The fourth embodiment has total sixteen heads, but if the number of heads operated in each disk control device is limited to four, the design can also be such that the heads are operated for the magneto-optical disk shown in FIG. 1 and recording and reproduction are effected at a transfer rate twice as high as the conventional one.

We claim:

1. An apparatus comprising:
   two magneto-optical disk devices in each of which a magneto-optical disk is loaded, said magneto-optical disk having a plurality of annular recording areas disposed at different distances, respectively, from a center of said magneto-optical disk, each of said two devices having an even number of head means for applying beams to said magneto-optical disk to record data on said magneto-optical disk, to reproduce data recorded on said magneto-optical disk and output reproducing signals, and to erase data recorded on said magneto-optical disk, control means for controlling said head means so that said head means apply beams to different ones, respectively, of said plurality of annular areas on said magneto-optical disk, and a plurality of applying means for applying a magnetic field to said magneto-optical disk, and wherein each of said applying means applies a magnetic field to said magneto-optical disk in a predetermined direction when data is recorded on said magneto-optical disk and applies a magnetic field to said magneto-optical disk in the opposite direction when data recorded on said magneto-optical disk is erased; and means for combining the reproducing signals from said two magneto-optical disk devices.

2. An apparatus according to claim 1, wherein said control means has a plurality of supporting means, each supporting a corresponding pair of said plurality of head means so as to apply beams to two annular areas which are separated by at least another annular area.

* * * * *